United States Patent
Kojima et al.

(10) Patent No.: US 7,050,263 B2
(45) Date of Patent: May 23, 2006

(54) HARD DISC DRIVE COVER-INTEGRATED GASKET

(75) Inventors: Yoshifumi Kojima, Fujisawa (JP); Kenichi Fujimoto, Fujisawa (JP); Atsushi Koga, Fujisawa (JP); Kazuhisa Senda, Fujisawa (JP)

(73) Assignee: NOK Corporation, Tokyo (JP)

( * ) Notice: Subject to any disclaimer, the term of this patent is extended or adjusted under 35 U.S.C. 154(b) by 301 days.

(21) Appl. No.: 10/701,000

(22) Filed: Nov. 4, 2003

(65) Prior Publication Data

US 2005/0104303 A1    May 19, 2005

(51) Int. Cl.
*G11B 17/02*    (2006.01)

(52) U.S. Cl. .................................................. 360/97.02

(58) Field of Classification Search ............. 360/97.01, 360/97.02, 97.03
See application file for complete search history.

(56) References Cited

U.S. PATENT DOCUMENTS

| | | | | |
|---|---|---|---|---|
| 5,326,611 A | * | 7/1994 | Kishita et al. ........... | 360/97.02 |
| 5,422,766 A | * | 6/1995 | Hack et al. ............... | 360/97.02 |
| 6,889,984 B1 | * | 5/2005 | Hatanaka .................. | 360/97.02 |

FOREIGN PATENT DOCUMENTS

| | | |
|---|---|---|
| JP | 2517797 | 5/1996 |
| JP | 2961068 | 7/1999 |
| JP | 2000-230167 | 8/2000 |
| JP | 2003-173671 | 6/2003 |

* cited by examiner

*Primary Examiner*—Robert S. Tupper
(74) *Attorney, Agent, or Firm*—Butzel Long

(57) ABSTRACT

A hard disc drive cover-integrated gasket, which comprises a metallic cover and a packing material integrated with the metallic cover, the packing material being a molding material from a mixture comprising 100 parts by weight of EPDM or a blend of EPDM and polystyrene type thermoplastic elastomer, 10–100 parts by weight of polypropylene type resin, 20–130 parts by weight of a plasticizer and 0.1–10 parts by weight of a cross-linking agent is easy to fabricate and has distinguished characteristics as low outgassing characteristics, low hardness, good sealability at elevated temperatures, etc.

6 Claims, No Drawings

HARD DISC DRIVE COVER-INTEGRATED GASKET

BACKGROUND OF THE INVENTION

1) Field of the Invention

The present invention relates to a hard disc drive cover-integrated gasket, and more particularly to a hard disc drive cover-integrated gasket, which is easy to fabricate and has improved characteristics such as low outgassing and good sealability.

2) Related Art

Recent tendency toward smaller sizes and higher performance of electronic appliances is requiring smaller and thinner structural parts, consequently giving rise to deterioration of assembling efficiency in the fabrication process. To overcome such a problem, integration and combination of parts are keenly desired, together with improvements in their characteristics or performances such as outgassing, sealability, etc.

In electronic memory apparatuses, gaskets to be fitted to the hard disc drive cover particularly for preventing intrusion of water or dusts and for satisfying low-outgassing requirements have been so far fitted to the hard disc drive in the sandwich form of a single rubber sheet or a foamed polyurethane sheet between metallic covers of stainless steel, aluminum, etc. In this connection, it has been proposed to integrate a metallic cover of stainless steel, etc. with a rubber material such as fluoroelastomers, etc. by bonding with an adhesive, thereby improving the assembling efficiency (JP No. 2,517,797).

However, the proposed method is based on preparation of gasket-shaped rubber through an additional vulcanization molding step in advance, followed by bonding the rubber to a metallic cover with an adhesive, needing a prolonged series of process steps and complicating the process per se. Actually, the gasket vulcanization step needs a few minute, and the vulcanized gaskets are liable to tear off to smaller pieces or are readily susceptible to dust deposition thereon, etc., so repeated washing or screening is imperative before the assembling. Thus, a more simplified method has been keenly desired.

To overcome the foregoing problems, it has been proposed to use a gasket material comprising a polystyrene type block copolymer elastomer capable of simplifying the process step without a vulcanization step and also capable of material recycling to reduce the cost, as compared with the conventional rubber material (JP No. 2,961,068).

The proposed material is liable to become finer, softer and more sticky. Unless the material has been fixed by some means in advance, the working efficiency will be lowered in the assembling work of hard disc drives. To overcome this problem, a gasket of polystyrene type block copolymer elastomer is prepared by injection molding into the so called frame in advance, followed by inserting the framed gasket between a box and a cover of hard disc drive to effect the desired integration. After all, additional parts such as frame, etc. are required in the proposed method.

Due to the recent tendency toward higher performance of hard disc drive, gaskets to be fitted to the hard disc drive covers are inevitably exposed to elevated temperatures, e.g. 100° C. or higher. These polystyrene type thermoplastic elastomers have failed to attain satisfactory performance at such elevated temperatures.

Particularly, the gaskets to be fitted to the hard disc drive covers have strict requirements for sealability, cleanliness and heat resistance.

Three key factors that affect sealing characteristics are hardness, compression set characteristic and water permeability of the gasket. Hardness (JIS durometer type A) is preferably 60 or less. Gasket with a hardness of more than 60 fails to ensure sealing characteristic between the hard disc drive and the cover due to clearances formed therebetween by the bending backward force of the gasket, when fitted generally to assemble a hard disc drive product. Material with a poor compression set characteristic also fails to ensure sealing characteristics due to tension loss in the course of long-term use, material with a compression set of 100% or higher is impractical. Furthermore, water vapor (moisture) as well as dirt and dust etc. is included as an object to be sealed, and thus the gasket materials must have a low water permeability. Involvement of water vapor inside the hard disc drive is a cause for generating rusts.

Cleanliness-controlling factors are the following three: outgassing, components as contained and a filler which tends to drop off from the gasket. When the outgases generated from the materials deposit onto the disc, such deposition will be a cause for crushing. Components as contained in constituent materials, such as chlorine, silicon, sulfur, sulfuric acid, nitric acid, acrylate esters, etc. (including their presence in the form of ions) will also cause corrosion of hard disc drive interior. When a large amount of a filler having no affinity toward the polymers is contained in the gasket materials, the filler particles have a high possibility of dropping off from the gasket to fall into the hard disc drive interior, giving also rise to crushing.

As is concerned with the heat resistance, the hard disc drives so far used in the personal computers, etc. are directed basically to indoor use, where the service conditions are at about 0°–about 60° C., or maximum at about 80° C. even if used in continuous operation with internal heat generation. When the hard disc drives are applied to car navigators, etc., on the other hand, it is imperative that the hard disc drives mounted on cars can be immediately started even after being left standing in a cold area at low temperatures such as down to about −40° C., or can maintain their performance even after being left standing in directly sun beam-irradiated, tightly closed car interior at elevated temperatures such as up to about 100° C. In the case of the polystyrene type thermoplastic elastomer as the leading material up to now, glass transition temperature (Tg) of the hard segment is about 100° C., and thus no better heat resistance is basically obtainable above about 100° C.

SUMMARY OF THE INVENTION

An object of the present invention is to provide a gasket for hard disc drive, which is easy to fabricate and has distinguished characteristics, such as low outgassing, low hardness, good sealability at elevated temperatures, etc.

The object of the present invention can be attained by a hard disc drive cover-integrated gasket, which comprises a metallic cover and a packing material integrated with the metallic cover, the packing material being a molding material from a mixture comprising 100 parts by weight of EPDM or a blend of EPDM and a polystyrene type thermoplastic elastomer, 10–100 parts by weight of polypropylene type resin, 20–130 parts by weight of a plasticizer and 0.1–10 parts by weight of a cross-linking agent.

DETAILED DESCRIPTION OF THE INVENTION

EPDM is an ethylene-propylene-diene terpolymer elastomer, including terpolymers with various diene monomers. EPDM can be formed into polyolefin type thermoplastic elastomers as a blend type upon mechanical blending with polypropylene type resin. Due to the presence of a cross-linking agent, EPDM can be also formed either into a partially cross-linked blend type upon partial cross-linking of EPDM or into a completely cross-linked blend type composite comprising a continuous phase of polypropylene and dispersed phases of completely cross-linked EPDM.

Thus, polyolefin type thermoplastic elastomers can be formed from a mixture of EPDM and polypropylene type resin (together with a cross-linking agent). In place of mixing these individual components, commercially available polyolefin type thermoplastic elastomers based on mixtures comprising these individual components in the above-mentioned proportions, for example, Mirastomer series of Mitsui Chemicals products, Suntprene series of AES products, etc., can be used as such in the present invention.

These polyolefin type thermoplastic elastomers have a distinguished heat resistance, because the softening temperature of polypropylene as a hard segment is about 130°–about 150° C., and have good outgassing, but somewhat higher hardness. To lower the hardness, the polyolefin type thermoplastic elastomers can be also used as a blend with a polystyrene type thermoplastic elastomer.

As already described above, when the cover is fixed to a hard disc drive through a gasket of high hardness, the cover will be warped due to the bending backward force of the gasket, resulting in failure to effect tight sealing, whereas the gasket with too low hardness, e.g. 10 or less, will be very sticky or lose the mechanical strength, resulting in easy tearing-off into smaller pieces. According to the gasket performance, the bending backward force of the gasket will be lowered by making the gasket finer, whereby a gasket with a correspondingly higher hardness can be used.

From this point of view, a packing material with a hardness (JIS durometer type A) of 20–60, preferably 30–50, is desirable. That is, polyolefin type thermoplastic elastomer comprising 100–20% by weight of EPDM as the main component and 0–80% by weight of polystyrene type thermoplastic elastomer, sum total being 100% by weight, can be used in the present invention. In other words, polyolefin type thermoplastic elastomer only of EPDM or that of a blend of EPDM with a polystyrene type thermoplastic elastomer can be used in the present invention. These two kinds of elastomers are nonpolar and are scarcely water vapor-permeable.

Particularly, polyolefin type thermoplastic elastomer comprising 100–50% by weight of EPDM as the main component has a remarkably improved sealability in terms of compression set characteristic after the heat treatment at elevated temperatures such as about 80°–about 100° C., whereas with increasing proportion of polystyrene type thermoplastic elastomer in the blend, the plasticizer retainability can be increased to facilitate appropriate adjustment of hardness. In the case of single use of polystyrene type thermoplastic elastomer, on the other hand, the compression set characteristic at elevated temperatures will be deteriorated, and the long-term sealability cannot be maintained.

Polystyrene type thermoplastic elastomer for use in the present invention includes triblock copolymer [SEPS] of polystyrene-poly(ethylene-propylene)-polystyrene, triblock copolymer [SEEPS] of polystyrene-poly(ethylene/ethylene-propylene)-polystyrene, etc. SEPS can be obtained by hydrogenation of polystyrene-polyisoprene-postyrene block copolymer, whereas SEEPS can be obtained by hydrogenation of polystyrene(butadiene-isoprene) random copolymer-polystyrene block copolymer.

These polystyrene type thermoplastic elastomers preferably have a number average molecular weight Mn of 50,000 or more. Below 50,000, bleeding of the plasticizer will be increased, and the compression set will be also increased, resulting in such inconvenience as being practically unapplicable. The upper limit of the number average molecular weight Mn is not particularly limit but is usually about 400,000. Content of amorphous styrene block of the polystyrene type thermoplastic elastomer is 10–70% by weight, preferably 15–60% by weight. Glass transition temperature (Tg) of the amorphous styrene block is 60° C. or higher, preferably 80° C. or higher. Polymer which connects both terminal amorphous styrene blocks is preferably amorphous. The polystyrene type thermoplastic elastomer to be contained in the polyolefin type thermoplastic elastomer can be used in a single species or in a mixture of at least two species thereof. Actually, commercially available Septon 2006 [SEPS] and Septon 4055 [SEEPS] can be used in the present invention, both of which are Kuraray's products to satisfy the aforementioned conditions.

Polypropylene type resin and plasticizer are selected in view of moldability and hardness of packing material, to be obtained by molding. Polypropylene type resin affects the moldability, whereas the plasticizer adjusts the hardness. On this ground, mixing proportions of polypropylene type resin and plasticizer must be appropriately selected.

Polypropylene type resin for use in the present invention includes crystalline polymers such as propylene homopolymer, copolymers of propylene with a small proportion of α-olefin (e.g. ethylene, 1-butene, 1-hexene, 4-methyl-1-pentene, etc.). Polypropylene type resin is used in a proportion of 10–100 parts by weight, preferably 20–80 parts by weight, on the basis of 100 parts by weight of EPDM or a blend of the EPDM with the polystyrene type thermoplastic elastomer as the main component of the polyolefin type thermoplastic elastomer. Above 100 parts by weight of the polypropylene type resin, the resulting molding product will have a higher hardness, whereas below 10 parts by weight the resulting mixture will have a lower flowability, making injection molding hard to conduct.

Any plasticizer can be used without any particular restriction, so far as it can be used in the ordinary rubber or thermoplastic elastomers. The plasticizer for use in the present invention includes, for example, a petroleum-based softening agent such as process oil, lubricating oil, paraffin oil, etc., a fatty acid-based softening agent such as castor oil, linseed oil, rapeseed oil, coconut oil, etc., ester-based plasticizer such as dibutyl phthalate, dioctyl phthalate, dioctyl adipate, dioctyl sebacate, or the like, among which paraffin oil is preferable. The plasticizer is used in a proportion of 10–130 parts by weight, preferably 50–120 parts by weight, on the basis of 100 parts by weight of EPDM or a blend of EPDM and polystyrene type thermoplastic elastomer. Above 130 parts by weight of the plasticizer, the resulting molding product will have higher outgassing, whereas below 10 parts by weight the molding product will have a poor sealability.

As a cross-linking agent for use in the present invention, an organic peroxide, so far usually used as a cross-linking agent for EPDM, can be used in the case of using EPDM, and an organic peroxide can be also preferably used in the case of using a blend of EPDM and polystyrene type thermoplastic elastomer. Thus, the organic peroxide for use in the present invention includes, for example, dicumyl peroxide, di-t-butyl peroxide, 2,5-dimethyl-2,5-di-(t-butylperoxy)hexane, t-butylcumyl peroxide, etc. The cross-linking agent is used in a proportion of 0.1–10 parts by weight, preferably 1–5 parts by weight, on the basis of 100 parts by weight of EPDM or a blend of EPDM and polystyrene type thermoplastic elastomer. The above-mentioned proportion is the commonly used one.

The mixture comprising the foregoing individual components as essential components can contain, if necessary, further additives usually used in the ordinary rubber or thermoplastic elastomers, for example, a powdery solid filler (such as various kinds of metal powder, glass powder, ceramic powder, granular or powdery polymer, etc.), an antioxidant (such as amines and their derivatives, imidazoles, phenols and their derivatives, etc.), waxes, a stabilizer, a tackifier, a mold release agent, a pigment, a flame retardant, a lubricant, etc.

To improve the wear resistance, moldability, etc. of the molding product a small proportion of thermoplastic resin or rubber can be further added thereto. Still furthermore, to improve the mechanical strength and rigidity of the molding product, short-length fibers, etc. can be also added thereto.

The mixture is melt kneaded by a heating kneader, such as a uniaxial extruder, a biaxial extruder, rolls, a Banbury mixer, a Brabender mixer, a kneader, a high-shearing mixer, etc. and, if further necessary, the mixture can be admixed with a cross-linking aid, or these necessary components are mixed together, followed by heat melting and kneading, or a thermoplastic material is prepared by kneading organic polymer materials and the plasticizer in advance, and is used upon further mixing with at least one organic polymer material of the same species as used above or different species.

The thus obtained thermoplastic elastomer compound, which comprises EPDM or a blend of EPDM and polystyrene type thermoplastic elastomer as the main component of polyolefin type thermoplastic elastomer, polypropylene type resin, a plasticizer and a cross-linking agent, is injection molded with an adhesive-coated metallic cover as inserted into a mold, whereby the compound can be molded into a gasket integrated with the metal cover as a packing material.

The metallic cover for use in the present invention is made from, for example, an aluminum sheet, a galvanized aluminum sheet, a stainless steel sheet, a stainless steel damping sheet, or the like. The adhesive for use in the present invention includes those obtained by grafting polar groups of maleic anhydride, acrylic acid, etc. onto side chains of polyolefin type resin, thereby modifying the polyolefin type resin, followed by dissolution in an aromatic or aliphatic organic solvent to make a liquid solution or a dispersion, or those obtained by dissolving styrene-butadiene copolymer elastomer in an aromatic or aliphatic organic solvent to make a liquid solution, or the like. Without any adhesive, the metallic cover is liable to peel off the resulting molding product, resulting in failure of desired integrated molding. The adhesive can be applied to the metallic cover by a most appropriate method selected from dipping application, spraying application, screen printing, brush painting, stamping, etc.

By balancing the proportion of polypropylene type resin against that of plasticizer in the aforementioned ranges, the hardness (JIS durometer type A) and the compression set (JIS K6262, 100° C. for 72 hours) of the gasket of the molded packing material can be adjusted to 20–60, preferably 20–50, and not more than 50%, respectively. When the hardness exceeds 60, the bending backward force of the cover-integrated gasket, when fabricated by fitting the gasket to the hard disc drive cover, will be large enough to cause deformation of the cover with the result of incomplete sealing. That is, the gasket has a poor sealability. When the hardness is less than 20, on the other hand, the gasket will easily tear off or will be sticky. Thus, careful handling must be made. When the compression set exceeds 50%, no long-term sealability can be obtained at elevated temperatures. The shape of a packing material to be molded depends on the shape of a hard disc drive cover to be integrated therewith.

The present hard disc drive cover-integrated gasket has distinguished characteristics such as low hardness, good sealability at elevated temperatures, low outgassing, low water permeability, good adhesiveness, good moldability, etc. and thus can serve as an effective packing material for hard disc drive cover. Particularly in the case of using, as the main constituent of the gasket molding, a polyolefin type thermoplastic elastomer comprising EPDM as the main component, distinguished sealability at elevated temperatures can be obtained, as given in terms of compression set values at elevated temperatures in the following Examples.

PREFERRED EMBODIMENTS OF THE INVENTION

The present invention will be described in detail below, referring to Examples.

EXAMPLE 1

| | Parts by weight |
|---|---|
| EPDM (Mitsui EPT 3045, Mitsui Chemicals product) | 100 |
| Polypropylene type resin (J700GP, Idemitsu Kosan product) | 25 |
| Paraffin oil (Diana Process oil PW380, Idemitsu Kosan product) | 100 |
| Cross-linking agent (Percumyl D, NOF product) | 2 |

The foregoing components were injection molded into test sheets (150 mm×150 mm×2 mm) by an injection molding machine (KM-80, made by Kawaguchi Iron Works, Ltd.) at a set temperature: 210°–180° C., injection speed: 0.5 sec., injection pressure: 100 MPa and cycle time: 30 sec. The test sheets were used in tests of hardness, compression set at elevated temperatures, outgassing and water permeability. A piece of cover-shaped aluminum sheet (electrolessly nickel plated to a thickness of 2–5 μm) was coated with a modified olefin type resin adhesive (Skip #66, Sotec product) and inserted into a mold in advance, and the afore-mentioned same components were injection molded into the mold likewise under conditions of injection speed: 0.5 sec., injection pressure: 30 MPa and cycle time: 30 sec. to form a gasket integrated with the cover piece. The resulting cover-integrated gasket was then subjected to sealability test, adhesiveness test and moldability evaluation.

EXAMPLE 2

In Example 1, the amount of paraffin oil was changed to 120 parts by weight.

COMPARATIVE EXAMPLE 1

In Example 1, the same amount of polystyrene type thermoplastic elastomer (Septon 4055, a Kuraray product) was used in place of EPDM.

COMPARATIVE EXAMPLE 2

In Comparative Example 1, the amount of paraffin oil was changed to 120 parts by weight.

Test sheets and cover-integrated gaskets obtained in Examples 1 and 2 and Comparative Examples 1 and 2 were subjected to determination of the following properties:

Hardness: according to JIS K6253 (a stack of three test sheets)

Compression set test at elevated temperatures: according to JIS K6262; to determine percent compression set value at 100° C. for 72 hours Outgassing test: a rectangular test sheet (50 mm×3 mm×2 mm) was subjected to hot extraction at 120° C. for one hour and then subjected to determination of outgassing amount. Outgassing amounts of less than 50 μg/g are shown by ○, and those of 50 μg/g or more by X in the following Tables 1, 2 and 3. (Sheets with an outgassing amount of 50 μg/g or more were evaluated as unpreferable for a gasket for hard disc drive cover requiring higher performance such as a server, etc.)

Water permeability test: 10 ml of distilled water was put into a stainless steel (SUS) cylindrical vessel (inner diameter: 27 mm, depth: 50 mm), and a test sheet, shaped into a disc form (30 mm in diameter and 1 mm in thickness) was placed on the open top of the cylindrical vessel and fixed with a concentrically hollow stainless steel cover disc (opening inner diameter: 27 mm). From the resulting data at 70° C. for 100 hours were calculated water permeation coefficients (g·mm/cm$^2$·24 hrs). Coefficients of less than $5 \times 10^{-3}$ (g·mm/cm$^2$·24 hrs) are shown by ○, and those of $5 \times 10^{-3}$ (g·mm/cm$^2$·24 hrs) or more by X in the following Tables 1, 2 and 3. (Sheets with a water permeation coefficient of $5 \times 10^{-3}$ or more were evaluated as unpreferable for a gasket for hard disc drive cover)

Sealability test: cover-integrated gasket was mounted onto an actual leak tester and subjected to heat treatment at 80° C. for 168 hours in that state, and returned to room temperature. Then, a positive pressure of 5 kPa was continuously applied for 30 seconds from the inside of the tester. The gaskets without any leakage after 15 seconds are shown by ○, and those with leakage by X in the following Tables 1, 2 and 3. (Leakage took place when the gasket material had an inferior compression set-characteristic or defects in the gasket shape)

Adhesiveness test: a perforated peel of the gasket, about 1 mm long, was made on the gasket adhesion side of a cover-integrated gasket, and a stainless steel (SUS) wire was passed through the peel perforation portion, and a vertical tensile load was applied to the peel by the wire through the peel perforation portion to measure the load when the peel length was extended to about 10 mm. Those with a peeling load of 100 kPa or more are shown by ○, and those with less than 100 kPa are shown by X in the following Tables 1, 2 and 3. (Cover-integrated gaskets with a peeling load of 100 kPa or more had a satisfactory adhesiveness even under the actual service conditions)

Moldability evaluation: evaluation was made by visually observing molding defects of product shape in the injection molding. That is, those without such defects as deformation, shrinkage, chipping, welds, short shot, flash, etc. or without defects in cover integrated moldings are shown as ○, and those with such defects by X in the following Tables 1, 2 and 3.

The results of the foregoing Examples and Comparative Examples are shown in the following Table 1.

TABLE 1

|  | Example | | Comp. Ex. | |
| --- | --- | --- | --- | --- |
|  | 1 | 2 | 1 | 2 |
| [Test sheet] | | | | |
| Hardness (durometer type A) | 50 | 40 | 45 | 40 |
| Compression set at elevated temperatures (%) | 43 | 40 | 44 | 41 |
| Outgassing | ○ | ○ | X | X |
| Water permeability | ○ | ○ | ○ | ○ |
| [Gasket] | | | | |
| Sealability | ○ | ○ | X | X |
| Adhesiveness | ○ | ○ | ○ | ○ |
| Moldability | ○ | ○ | ○ | ○ |

EXAMPLE 3

|  | Parts by weight |
| --- | --- |
| EPDM (EPT3045, Mitsui Chemicals product) | 100 |
| Polystyrene type thermoplastic elastomer (Septon 2006, Kuraray product [SEPS]) | 50 |
| Polypropylene type resin (J700GP) | 25 |
| Paraffin oil (Diana Process Oil PW380) | 100 |
| Cross-linking agent (Percumyl D) | 2 |

The foregoing components were mixed and extruded by a biaxial extruder (Hyper KTX46, made by Kobe Steel, Ltd.) at a temperature of 210°–180° C. and a revolution speed of 150 rpm to make compounds.

The resulting compounds were injection molded into test sheets (150 mm×150 mm×2 mm) by an injection molding machine (KM-80, made by Kawaguchi Iron Works, Ltd.) at a temperature: 210°–180° C., injection speed: 0.5 sec., injection pressure: 100 MPa and cycle time: 30 sec. The test sheets were used in tests of hardness, compression set at elevated temperatures, outgassing and water permeability. A piece of cover-shaped aluminum sheet (electrolessly nickel plated to a thickness of 2–5 μm) was coated with a modified olefin type resin adhesive (Skip #66, Sotec product), and inserted into a mold in advance, and the same compounds were injection molded into the mold likewise under conditions of injection speed: 0.5 sec., injection pressure: 30 MPa and cycle time: 30 sec. to form a gasket integrated with the cover piece. The resulting cover-integrated gasket was then subjected to sealability test, adhesiveness test and moldability evaluation.

EXAMPLE 4

In Example 3, the amount of EPDM was changed to 70 parts by weight, and that of polystyrene type thermoplastic elastomer [SEPS] to 30 parts by weight.

EXAMPLE 5

In Example 3, the amount of EPDM was changed to 30 parts by weight, and that of polystyrene type thermoplastic elastomer [SEPS] was changed to 70 parts by weight.

EXAMPLE 6

In Example 3, the same amount of another polystyrene type thermoplastic elastomer (Septon 4055, Kuraray product [SEEPS]) was used in place of the polystyrene type thermoplastic elastomer [SEPS].

EXAMPLE 7

In Example 3, a styrene-butadiene copolymer elastomer-based adhesive (Diabond DA3188, Nogawa Chemical product) was used in place of the modified olefin type resin adhesive.

The test sheets and cover-integrated gaskets obtained in Examples 3 to 7 were subjected to tests of hardness, compression set at elevated temperatures, outgassing, water permeability, sealability and adhesiveness, and moldability evaluation. In the sealability test, evaluation was carried out without heat treatment at 80° C. for 168 hours. Results of the foregoing Examples 3 to 7 are shown in the following Table 2.

TABLE 2

|  | Example | | | | |
|---|---|---|---|---|---|
|  | 3 | 4 | 5 | 6 | 7 |
| [Test sheet] | | | | | |
| Hardness (durometer type A) | 45 | 48 | 40 | 46 | 40 |
| Compression set at elevated temperatures (%) | 45 | 42 | 47 | 45 | 45 |
| Outgassing | ◯ | ◯ | ◯ | ◯ | ◯ |
| Water permeability | ◯ | ◯ | ◯ | ◯ | ◯ |
| [Gasket] | | | | | |
| Sealability | ◯ | ◯ | ◯ | ◯ | ◯ |
| Adhesiveness | ◯ | ◯ | ◯ | ◯ | ◯ |
| Moldability | ◯ | ◯ | ◯ | ◯ | ◯ |

COMPARATIVE EXAMPLE 3

In Example 6, EPDM was not used, but the amount of polystyrene type thermoplastic elastomer [SEEPS] was changed to 100 parts by weight.

COMPARATIVE EXAMPLE 4

In Example 3, the amount of paraffin oil was changed to 5 parts by weight.

COMPARATIVE EXAMPLE 5

In Example 3, the amount of paraffin oil was changed to 150 parts by weight.

COMPARATIVE EXAMPLE 6

In Example 3, the amount of polypropylene type resin was changed to 5 parts by weight.

COMPARATIVE EXAMPLE 7

In Example 3, the amount of polypropylene type resin was changed to 120 parts by weight.

Results obtained in the foregoing Comparative Examples 3 to 7 are shown in the following Table 3.

TABLE 3

|  | Comparative Example | | | | |
|---|---|---|---|---|---|
|  | 3 | 4 | 5 | 6 | 7 |
| [Test sheet] | | | | | |
| Hardness (durometer type A) | 44 | 74 | 28 | 39 | 86 |
| Compression set at elevated temperatures (%) | 68 | 53 | 51 | 45 | 73 |
| Outgassing | ◯ | ◯ | X | ◯ | ◯ |
| Water permeability | ◯ | ◯ | ◯ | X | ◯ |
| [Gasket] | | | | | |
| Sealability | ◯ | X | ◯ | ◯ | X |
| Adhesiveness | ◯ | ◯ | X | ◯ | ◯ |
| Moldability | ◯ | ◯ | ◯ | X | ◯ |

What is claimed is:

1. A hard disc drive cover-integrated gasket, which comprises a metallic cover and a packing material integrated with the metallic cover, the packing material being a molding material from a mixture comprising 100 parts by weight of a blend of EPDM and polystyrene type thermoplastic elastomer, 10–150 parts by weight of polypropylene type resin, 20–130 parts by weight of a plasticizer and 0.1–10 parts by weight of a cross-linking agent.

2. A hard disc drive cover-integrated gasket according to claim 1, wherein the blend comprises not less than 20% by weight of EPDM and not more than 80% by weight of polystyrene type thermoplastic elastomer.

3. A hard disc drive cover-integrated gasket according to claim 1, wherein the plasticizer is paraffin oil.

4. A hard disc drive cover-integrated gasket according to claim 1, wherein the polystyrene type thermoplastic elastomer is a polystyrene-poly(ethylene-propylene)-polystyrene block copolymer.

5. A hard disc drive cover-integrated gasket according to claim 1, wherein the polystyrene type thermoplastic elastomer is a polystyrene-poly(ethylene/ethylene-propylene)-polystyrene block copolymer.

6. A hard disc drive cover-integrated gasket according to claim 1, wherein the packing material has a hardness (JIS durometer type A) of 20–60 and a compression set value (JIS K6262, 100° C. for 72 hours) of not more than 50%.

* * * * *